(12) United States Patent
Enomoto et al.

(10) Patent No.: US 12,487,129 B2
(45) Date of Patent: Dec. 2, 2025

(54) SEMICONDUCTOR MANUFACTURING APPARATUS INCLUDING TEMPERATURE SENSOR INSIDE GAS PIPE AND TEMPERATURE CONTROL METHOD THEREOF

(71) Applicant: Tokyo Electron Limited, Tokyo (JP)

(72) Inventors: Tadashi Enomoto, Iwate (JP); Tsutomu Sugawara, Iwate (JP)

(73) Assignee: TOKYO ELECTRON LIMITED, Tokyo (JP)

( * ) Notice: Subject to any disclaimer, the term of this patent is extended or adjusted under 35 U.S.C. 154(b) by 840 days.

(21) Appl. No.: 17/826,805

(22) Filed: May 27, 2022

(65) Prior Publication Data

US 2022/0390288 A1 Dec. 8, 2022

(30) Foreign Application Priority Data

Jun. 2, 2021 (JP) .................................. 2021-093048

(51) Int. Cl.
*G01K 1/14* (2021.01)
*C23C 16/455* (2006.01)
*C23C 16/52* (2006.01)
*G01K 13/024* (2021.01)
*H05B 1/02* (2006.01)

(52) U.S. Cl.
CPC ............. *G01K 1/14* (2013.01); *G01K 13/024* (2021.01); *H05B 1/0233* (2013.01); *C23C 16/4557* (2013.01); *C23C 16/52* (2013.01)

(58) Field of Classification Search
CPC ........ G01K 1/14; G01K 13/024; G01K 1/026; H05B 1/0233; C23C 16/4557; C23C 16/52; C23C 16/45578; H01L 21/67017; H01L 21/67248; H01L 21/67103
See application file for complete search history.

(56) References Cited

FOREIGN PATENT DOCUMENTS

| JP | S55-119028 A | 9/1980 |
|---|---|---|
| JP | 2004-172409 A | 6/2004 |
| JP | 2011119378 A | * 6/2011 |

* cited by examiner

*Primary Examiner* — John P. Dulka
(74) *Attorney, Agent, or Firm* — Venjuris, P.C.

(57) ABSTRACT

A semiconductor manufacturing apparatus includes: a gas introduction pipe connected to a processing container of the semiconductor manufacturing apparatus in order to introduce a gas into the processing container; and a temperature sensor provided in the gas introduction pipe in order to measure a temperature of a gas in the gas introduction pipe.

12 Claims, 5 Drawing Sheets

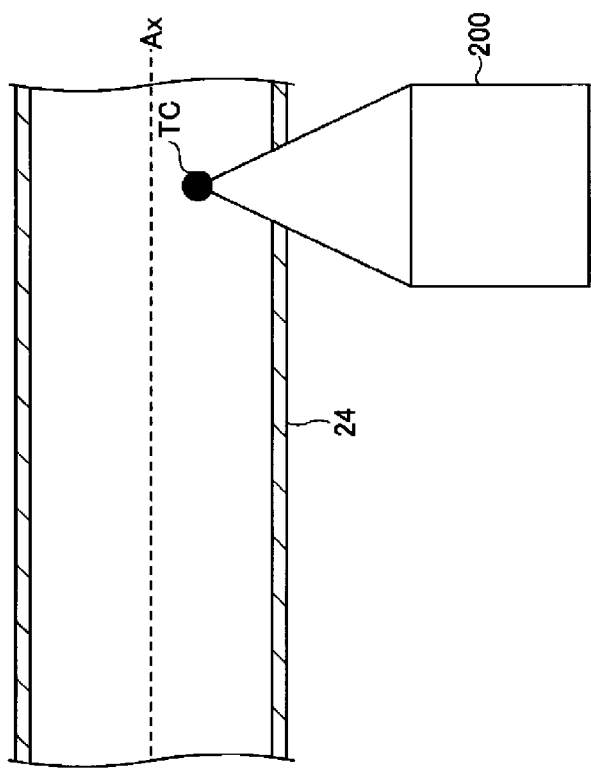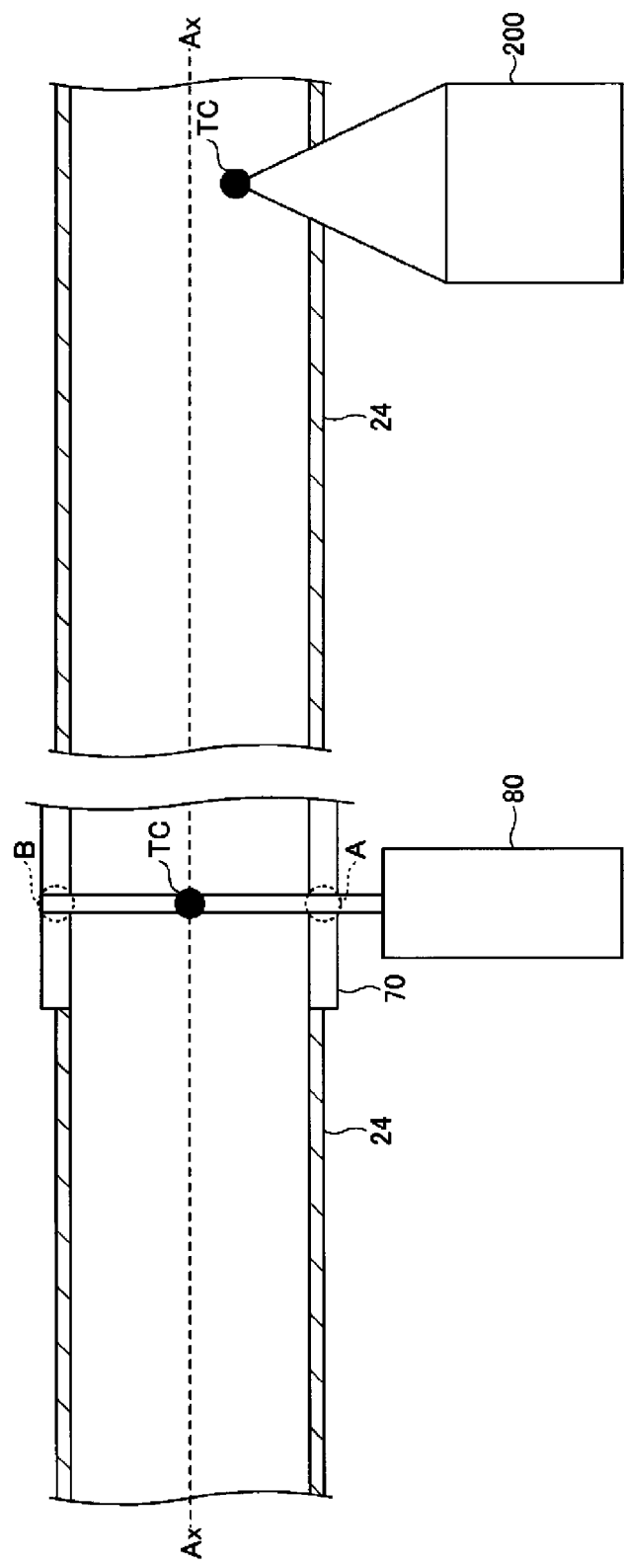

SEMICONDUCTOR MANUFACTURING APPARATUS INCLUDING TEMPERATURE SENSOR INSIDE GAS PIPE AND TEMPERATURE CONTROL METHOD THEREOF

CROSS-REFERENCE TO RELATED APPLICATIONS

This application is based on and claims priority from Japanese Patent Application No. 2021-093048, filed on Jun. 2, 2021, with the Japan Patent Office, the disclosure of which is incorporated herein in its entirety by reference.

TECHNICAL FIELD

The present disclosure relates to a semiconductor manufacturing apparatus and a temperature control method.

BACKGROUND

It has been proposed, for example, to measure a temperature inside a processing container of a semiconductor manufacturing apparatus, and use the measurement result for controlling process conditions of a substrate processing performed in the processing container (see, e.g., Japanese Laid-Open Patent Publication No. 2004-172409).

SUMMARY

According to an aspect of the present disclosure, a semiconductor manufacturing apparatus includes: a gas introduction pipe connected to a processing container of the semiconductor manufacturing apparatus and configured to introduce a gas into the processing container; and a temperature sensor provided in the gas introduction pipe and configured to measure a temperature of a gas in the gas introduction pipe.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF THE DRAWINGS

FIGS. 2A and 2B are views illustrating a temperature sensor according to the embodiment and a temperature sensor according to a comparative example.

DETAILED DESCRIPTION

Figure 1:
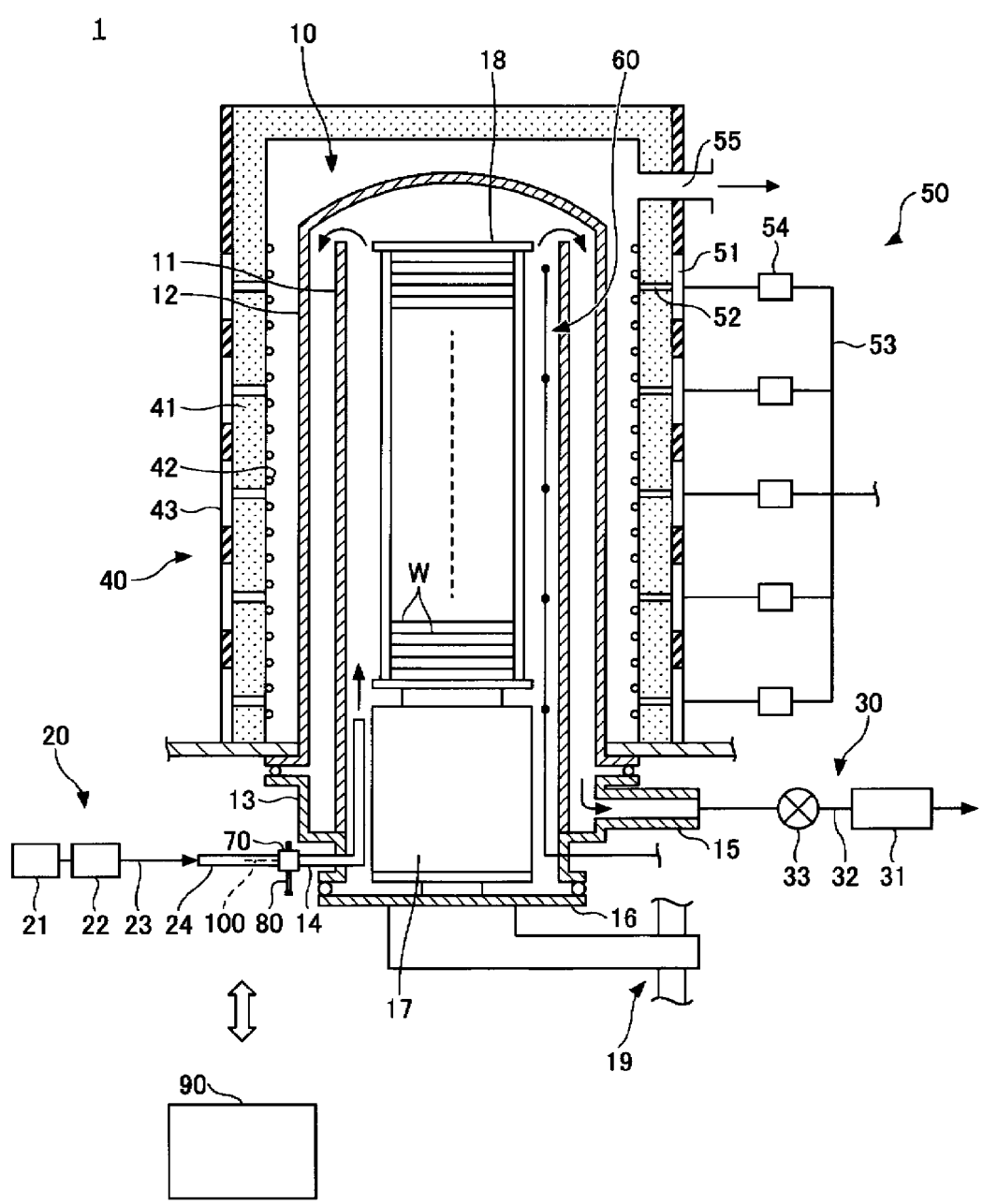
FIG. 1 is a schematic cross-sectional view illustrating an example of a semiconductor manufacturing apparatus according to an embodiment.

In the following detailed description, reference is made to the accompanying drawings, which form a part hereof. The illustrative embodiments described in the detailed description, drawings, and claims are not meant to be limiting. Other embodiments may be utilized, and other changes may be made without departing from the spirit or scope of the subject matter presented here.

Hereinafter, an embodiment for performing the present disclosure will be described with reference to the drawings. In the respective drawings, the same components will be denoted by the same reference numerals, and overlapping descriptions thereof will be omitted.

[Semiconductor Manufacturing Apparatus]

First, an example of a semiconductor manufacturing apparatus of an embodiment will be described with reference to FIG. 1. FIG. 1 is a schematic cross-sectional view illustrating an example of the semiconductor manufacturing apparatus of the embodiment.

The semiconductor manufacturing apparatus 1 includes, for example, a processing container 10, a gas supply unit 20, an exhaust unit 30, a heating unit 40, a cooling unit 50, and a control unit 90.

The processing container 10 has a substantially cylindrical shape. The processing container 10 includes, for example, an inner pipe 11, an outer pipe 12, a manifold 13, an injector 14, a gas outlet 15, and a lid 16. The inner pipe 11 has a substantially cylindrical shape. The inner pipe 11 is made of, for example, a heat-resistant material such as quartz. The inner pipe 11 is also referred to as an inner tube.

The outer pipe 12 has a substantially cylindrical shape with a ceiling, and is provided concentrically around the inner pipe 11. That is, the inner pipe 11 and the outer pipe 12 form a double pipe structure. The outer pipe 12 is made of, for example, a heat-resistant material such as quartz. The outer pipe 12 is also referred to as an outer tube.

The manifold 13 has a substantially cylindrical shape. The manifold 13 supports the lower ends of the inner pipe 11 and the outer pipe 12. The manifold 13 is made of, for example, stainless steel. The injector 14 penetrates the manifold 13 to extend horizontally into the inner pipe 11, and is bent in an L shape inside the inner pipe 11 to extend upward. The base end of the injector 14 is connected to a gas introduction pipe 24, and the tip thereof is opened. The injector 14 discharges a processing gas introduced through the gas introduction pipe 24 (hereinafter, also simply referred to as a "gas") into the inner pipe 11 from the opening at the tip thereof. The processing gas includes, for example, a film forming gas, a cleaning gas, and a purge gas. In the present embodiment, the film-forming gas is used for forming a silicon-containing film, and includes, for example, a silicon-containing gas, a nitriding gas, an oxidizing gas, and a doping gas. The silicon-containing film includes, for example, a silicon film, a silicon nitride film, and a silicon oxide film. The silicon film includes, for example, an amorphous silicon (a-Si) film, a polysilicon (poly-Si) film, and a doped silicon (dopped-Si) film. The cleaning gas is used for performing a cleaning method, and includes, for example, a halogen-containing gas such as $F_2$ gas, $Cl_2$ gas, $ClF_3$ gas, $NF_3$ gas, and HF gas. The purge gas is used for replacing the atmosphere in the processing container 10 with an inert gas atmosphere, and includes, for example, an inert gas such as $N_2$ gas or Ar gas. While the example of FIG. 1 illustrates one injector 14, a plurality of injectors 14 may be provided.

The gas outlet 15 is formed in the manifold 13. An exhaust pipe 32 is connected to the gas outlet 15. The processing gas supplied into the processing container 10 is exhausted by the exhaust unit 30 via the gas outlet 15.

The lid 16 airtightly closes the opening of the manifold 13 at the lower end thereof. The lid 16 is made of, for example, stainless steel. A wafer boat 18 is disposed on the lid 16 via a heat insulating cylinder 17. The heat insulating cylinder 17 and the wafer boat 18 are made of, for example, a heat-resistant material such as quartz. The wafer boat 18 holds a plurality of wafers W substantially horizontally at predetermined intervals in the vertical direction. When a lifting mechanism 19 moves the lid 16 upward, the wafer boat 18 is carried (loaded) into the processing container 10, and accommodated in the processing container 10. When the lifting mechanism 19 moves the lid 16 downward, the wafer boat 18 is carried out (unloaded) from the processing container 10.

The gas supply unit 20 includes a gas source 21, an integrated gas system (IGS) 22, an external pipe 23, and the gas introduction pipe 24. The gas source 21 is a supply source of the processing gas, and includes, for example, a film-forming gas source, a cleaning gas source, and a purge gas source. The IGS 22 is an integrated circuit of gas pipes, in which a group of pipes connected to, for example, the film-forming gas source, the cleaning gas source, and the purge gas source of the gas source 21, respectively, are integrated. A flow rate control unit is provided in the IGS 22 to control the flow rate of the gas flowing through each pipe. The flow rate control unit includes, for example, a mass flow controller and an ON/OFF valve.

The IGS 22 is connected to the external pipe 23. The external pipe 23 is connected to the gas introduction pipe 24. The external pipe 23 is configured such that a heater is wound around the outer wall of the external pipe 23 to heat the external pipe 23. The gas introduction pipe 24 is connected to the processing container 10 of the semiconductor manufacturing apparatus 1, and introduces a gas into the processing container 10. That is, the flow rate control unit in the IGS 22 controls the flow rate of the processing gas from the gas source 21, and the processing gas flows into the gas introduction pipe 24 while being heated when flowing through the external pipe 23, and is supplied from the gas introduction pipe 24 into the processing container 10 through the injector 14. The injector 14 functions as a gas inlet of the processing container 10.

A gas pipe joint (hereinafter, referred to as a joint 70) is provided near the gas inlet of the processing container 10 to be connected to the gas introduction pipe 24. A temperature sensor 80 is configured to penetrate the joint 70. The temperature sensor 80 is configured to measure the temperature of the gas in the gas introduction pipe 24. The temperature sensor 80 transmits the measured temperature to the control unit 90. Further, a heater 100 is disposed in the gas introduction pipe 24, and configured to heat the gas in the gas introduction pipe 24.

The exhaust unit 30 includes an exhaust device 31, an exhaust pipe 32, and a pressure controller 33. The exhaust device 31 is, for example, a vacuum pump such as a dry pump or a turbo molecular pump. The exhaust pipe 32 connects the gas outlet 15 and the exhaust device 31 to each other. The pressure controller 33 is disposed in the middle of the exhaust pipe 32, and adjusts the conductance of the exhaust pipe 32 so as to control the pressure in the processing container 10. The pressure controller 33 is, for example, an automatic pressure control valve.

The heating unit 40 includes a heat insulating material 41, a heating element 42, and an outer skin 43. The heat insulating material 41 has a substantially cylindrical shape, and is provided around the outer pipe 12. The heat insulating material 41 is mainly formed of silica and alumina. The heating element 42 has a linear shape, and is provided in a spiral or meandering shape on the inner circumference of the heat insulating material 41. The heating element 42 is configured such that a temperature control may be performed for a plurality of zones obtained by dividing the processing container 10 in the height direction thereof. The outer skin 43 is provided to cover the outer periphery of the heat insulating material 41. The outer skin 43 retains the shape of the heat insulating material 41 and reinforces the heat insulating material 41. The outer skin 43 is made of a metal such as stainless steel. In order to suppress the influence of heat on the outside of the heating unit 40, a water-cooled jacket (not illustrated) may be provided on the outer periphery of the outer skin 43. The heating unit 40 heats the inside of the processing container 10 in the manner that the heating element 42 generates heat.

The cooling unit 50 supplies a cooling fluid toward the processing container 10 to cool the wafers W in the processing container 10. The cooling fluid may be, for example, air. The cooling unit 50 supplies the cooling fluid toward the processing container 10, for example, when rapidly dropping the temperature of the wafers W after a heat processing. Further, the cooling unit 50 supplies the cooling fluid toward the inside of the processing container 10, for example, at the time of performing a cleaning for removing a deposited film in the processing container 10. The cooling unit 50 includes a fluid flow path 51, spout holes 52, a distribution flow path 53, a flow rate adjusting unit 54, and a heat exhaust port 55.

A plurality of fluid flow paths 51 is formed in the height direction between the heat insulating material 41 and the outer skin 43. For example, each fluid flow path 51 is formed on the outside of the heat insulating material 41 along the circumferential direction thereof. The spout holes 52 are formed to penetrate the heat insulating material 41 from each fluid flow path 51, and spouts the cooling fluid into a space between the outer pipe 12 and the heat insulating material 41. The distribution flow path 53 is provided outside the outer skin 43, and distributes and supplies the cooling fluid to each fluid flow path 51. The flow rate adjusting unit 54 is disposed in the middle of the distribution flow path 53, and adjusts the flow rate of the cooling fluid supplied to the fluid flow paths 51.

The heat exhaust port 55 is provided above the plurality of spout holes 52, and discharges the cooling fluid supplied into the space between the outer pipe 12 and the heat insulating material 41 to the outside of the semiconductor manufacturing apparatus 1. The cooling fluid discharged to the outside of the semiconductor manufacturing apparatus 1 is cooled by, for example, a heat exchanger, and supplied again to the distribution flow path 53. The cooling fluid discharged to the outside of the semiconductor manufacturing apparatus 1 may be discharged without being reused.

The temperature sensor 60 detects the temperature inside the processing container 10. The temperature sensor 60 is provided in, for example, the inner pipe 11. The temperature sensor 60 may be provided at a position where the temperature inside the processing container 10 may be detected, and may be provided, for example, in the space between the inner pipe 11 and the outer pipe 12. The temperature sensor 60 includes a plurality of temperature measuring units provided at different positions in the height direction to correspond to, for example, a plurality of zones. The temperature measuring units of the temperature sensor 60 are provided to correspond to the zones of "TOP," "C-T," "CTR," "C-B," and "BTM" in this order from the top. The plurality of temperature measuring units may be, for example, thermocouples or temperature measuring resistors. The temperature sensor 60 transmits the temperatures detected by the plurality of temperature measuring units to the control unit 90.

The control unit 90 controls the operation of the semiconductor manufacturing apparatus 1. The control unit 90 may be, for example, a computer. A storage medium stores a computer program for performing the entire operation of the processing apparatus 1. The storage medium may be, for example, a flexible disk, a compact disk, a hard disk, a flash memory, or a DVD.

[Temperature Sensor]

By winding a heater around the outer wall of the gas introduction pipe 24 to perform a heating thereby indirectly heating the gas inside the pipe, and measuring the temperature of the gas introduction pipe 24 with a temperature sensor attached to the outer wall of the gas introduction pipe 24, the temperature of the gas in the pipe may be indirectly measured. In this case, a temperature difference occurs between the measured temperature and the temperature of the gas that actually flows in the gas introduction pipe 24. Further, the temperature difference may vary according to a change in flow rate of the gas inside the gas introduction pipe 24 or the structure of the pipe.

The temperature of the gas is one of the factors that affect a process (substrate processing) performed in the processing container 10. Thus, in the semiconductor manufacturing apparatus 1 of the present disclosure, the temperature sensor 80 capable of directly measuring the temperature of the gas in the gas introduction pipe 24 is provided. The installation position of the temperature sensor 80 is preferably a position where a temperature closest to the temperature of the gas in the processing container 10 may be measured, and may be a position near the gas inlet of the processing container 10. In the example of FIG. 1, the joint 70 is provided near the gas inlet of the gas introduction pipe 24 connected to the injector 14 that introduces a gas into the processing container 10, that is, near the injector 14, and the temperature sensor 80 is provided in the joint 70.

In the semiconductor manufacturing apparatus 1, when the substrates are processed, the inside of the processing container 10 is decompressed, and a gas valve (not illustrated) provided in the gas introduction pipe 24 is opened to supply a gas into the processing container 10. At this time, since the gas rapidly flows into the processing container 10 of the vacuum chamber at a rate close to or higher than the sound velocity, for example, at the rate of Mach 0.3 to less than Mach 0.1, the Karman vortex occurs inside the gas introduction pipe 24. Due to the Karman vortex, the temperature sensor 80 is highly likely to be damaged.

Meanwhile, when the temperature sensor 80 is made thick for the purpose of ensuring the strength that may withstand the Karman vortex, the dynamic characteristics of the temperature sensor 80 may be impaired, and as a result, the delay of a measured temperature with respect to an actual temperature may occur. Thus, the temperature sensor 80 of the embodiment described herein below has a structure which does not impair the dynamic characteristics and does not cause the damage due to the Karman vortex.

FIG. 2A illustrates the temperature sensor 80 of the embodiment, and FIG. 2B illustrates a temperature sensor 200 of a comparative example. In FIG. 2A, two holes are formed to penetrate the joint 70 bonded to the gas introduction pipe 24, and the temperature sensor 80 is inserted through the two holes and welded at both the ends of the joint 70. As a result, the temperature sensor 80 of the present disclosure is supported at two places A and B.

Meanwhile, in FIG. 2B, the temperature sensor 200 of the comparative example is inserted through one hole formed in the gas introduction pipe 24. The temperature sensor 200 of the comparative example is supported at one place. The temperature sensor may be inserted through one hole penetrating the joint 70 bonded to the gas introduction pipe 24.

In both the temperature sensors 80 and 200, a temperature measuring unit TC is disposed inside the inner wall of the gas introduction pipe 24. Thus, the temperature of the gas in the gas introduction pipe 24 may be measured. The temperature measuring unit TC of the temperature sensor 80 is provided on the central axis Ax of the gas introduction pipe 24, and the temperature measuring unit TC of the temperature sensor 200 is provided at a position deviating from the central axis Ax of the gas introduction pipe 24. However, the present disclosure is not limited thereto as long as the temperature measuring unit TC is disposed inside the inner wall of the gas introduction pipe 24. It may be more preferable that the temperature measuring unit TC is disposed near the central axis Ax.

The temperature sensor 200 of the comparative example has only one support point, and a resonance may easily occur in the temperature sensor 200. Since the resonance causes the damage due to the Karman vortex, the temperature sensor 200 may be damaged by the Karman vortex. Further, since the temperature sensor 200 is thicker than the temperature sensor 80, the dynamic characteristics of a measurement signal in the temperature sensor 80 may be impaired.

Meanwhile, the temperature sensor 80 of the embodiment has two support points, and the resonance hardly occurs in the temperature sensor 200. Thus, according to the configuration and the disposition of the temperature sensor 80, the risk of damage to the temperature sensor 80 due to the Karman vortex may be eliminated. That is, by bonding the temperature sensor 80 at two or more places, no resonance occurs, and the temperature sensor 80 may not be damaged even when the temperature sensor 80 is made thin. Further, as the temperature sensor 80 is made thin, the dynamic characteristics and the responsiveness become better. Thus, with the configuration of the temperature sensor 80 according to the embodiment, the structure of the temperature measuring unit TC may be made thin, the damage due to the Karman vortex which is caused by the resonance may not occur by bonding the temperature sensor at two or more places, the responsiveness is high, and the temperature of the gas in the joint 70 may be directly measured.

Examples 1 to 3

Figure 3A:
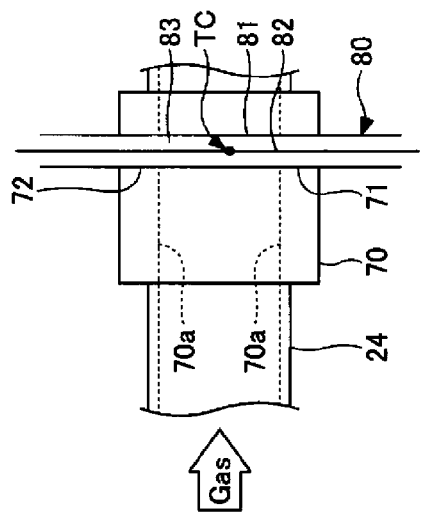
FIGS. 3A to 3C are views illustrating Examples 1 to 3 of the temperature sensor according to the embodiment.
Figure 3B:
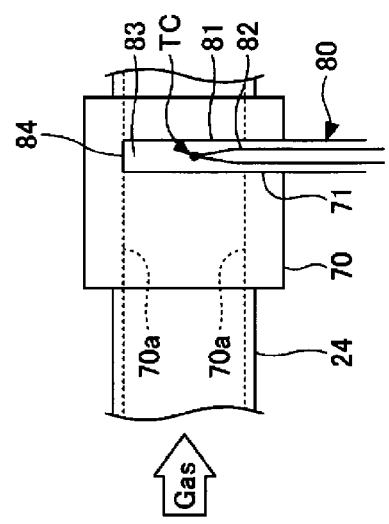
Figure 3C:
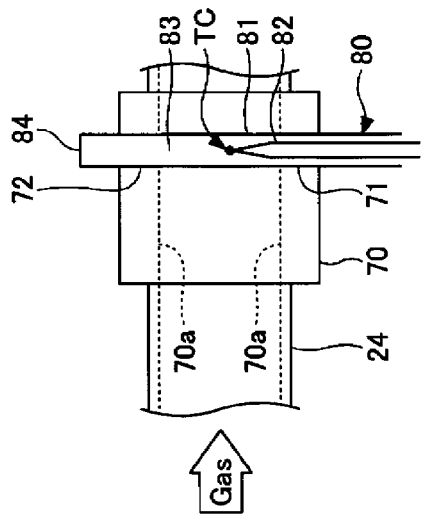

Next, Examples 1 to 3 of the temperature sensor 80 of the embodiment will be described with reference to FIGS. 3A to 3C. FIGS. 3A to 3C are views illustrating Examples 1 to 3 of the temperature sensor 80 according to the embodiment. As for the temperature sensor 80 illustrated in FIGS. 3A to 3C, a sheath temperature sensor is used. The temperature sensor 80 has a configuration in which a sheath thermocouple 82 (thermocouple strand) is inserted into an external sheath 81, and the inside of the sheath 81 is filled with an insulating material such as magnesium oxide 83. The sheath 81 is a metal cylindrical tube, and the material of the sheath 81 may be, for example, stainless steel (SUS316) or Inconel (NCF600). The material of the sheath 81 may be the same as or different from that of the joint 70 and/or the gas introduction pipe 24. In Examples 1 to 3, the temperature sensor 80 of the embodiment is a cylinder. However, the present disclosure is not limited thereto. The the temperature sensor 80 of the embodiment may have any shape (e.g., a prism such as a rectangular parallelepiped or another shape) as long as the Karman vortex may be suppressed. The shape that suppresses the Karman vortex may be determined in consideration of the disclosures in an article entitled "Generation of Karman Vortex Trains, Physics, and Mathematics," the Research Institute for Mathematical Sciences, Vol. 1776, 28-42, 2012.

Example 1

In Example 1 illustrated in FIG. 3A, two through holes 71 and 72 are formed in the joint 70, the temperature sensor 80 is inserted into the through holes 71 and 72, and the two places (both ends) of the through holes 71 and 72 are welded to bond the temperature sensor 80 to the joint 70. The tip 84 of the temperature sensor 80 is closed, and protrudes from the joint 70. The sheath thermocouple 82 is folded back inside the sheath 81, and the temperature measuring unit TC of the temperature sensor 80 is provided at the folded portion.

In this way, the temperature measuring unit TC of the temperature sensor 80 is disposed inside the inner wall 70a of the joint 70, and does not come into contact with the inner wall 70a. In each Example, the joint 70 may be a part of the gas introduction pipe 24, and the temperature measuring unit TC may be disposed inside the inner wall of the gas introduction pipe 24. That is, the temperature measuring unit TC is disposed inside the inner wall 70a, and does not come into contact with the inner wall 70a. As a result, the temperature sensor 80 may directly measure the temperature of the gas inside the gas introduction pipe 24.

The temperature sensor of Example 1 penetrates the two through holes 71 and 72 formed in the joint 70, and is bonded to the joint 70 at the two places of the through holes 71 and 72. As a result, no resonance occurs, and the damage to the temperature sensor 80 due to the Karman vortex may be prevented.

Example 2

In Example 2 illustrated in FIG. 3B, one through hole 71 is formed in the joint 70, the temperature sensor 80 is inserted into the through hole 71, and the tip 84 comes into contact with the inner wall 70a of the joint 70 that faces the through hole 71. In Example 2, a welding is performed at the two places (both ends) of the through hole 71 and the inner wall 70a in contact with the tip 84, to bond the temperature sensor 80 to the joint 70. The sheath thermocouple 82 is folded back inside the sheath 81 of the temperature sensor 80, and the temperature measuring unit TC of the temperature sensor 80 is provided at the folded portion.

In the temperature sensor 80 of Example 2 as well, the temperature measuring unit TC is disposed inside the inner wall 70a, and does not come into contact with the inner wall 70a. As a result, the temperature sensor 80 may directly measure the temperature of the gas inside the gas introduction pipe 24.

The temperature sensor of Example 2 is bonded to the joint 70 at the two places of the through hole 71 and the inner wall 70a. As a result, no resonance occurs, and the damage to the temperature sensor 80 due to the Karman vortex may be prevented.

Example 3

In Example 3 illustrated in FIG. 3C, the two through holes 71 and 72 are formed in the joint 70, the temperature sensor 80 is inserted into the through holes 71 and 72, and the two places of the through holes 71 and 72 are welded to bond the temperature sensor 80 to the joint 70. The tip of the temperature sensor 80 of Example 3 is opened, and protrudes from the joint 70. The sheath thermocouple 82 penetrates as a single wire in the sheath 81 of the temperature sensor 80, and the temperature measuring unit TC is provided in the sheath thermocouple 82. The temperature measuring unit TC is disposed inside the inner wall 70a, and does not come into contact with the inner wall 70a.

In the temperature sensor 80 of Example 3 having the configuration described above, the temperature measuring unit TC is disposed inside the inner wall 70a of the joint 70. As a result, the temperature sensor 80 may directly measure the temperature of the gas inside the gas introduction pipe 24.

Further, the temperature sensor of Example 3 penetrates the two through holes 71 and 72 formed in the joint 70, and is bonded to the joint 70 at the two places of the through holes 71 and 72. As a result, no resonance occurs, and the damage to the temperature sensor 80 due to the Karman vortex may be prevented.

(Common Features)

The temperature sensor 80 according to each Example is preferably configured to be disposed vertical to the flow of the gas flowing inside the gas introduction pipe 24 (the joint 70). Here, the term "vertical to the flow of the gas" is not limited to 90° with respect to the flow of the gas, and includes, for example, a case where the temperature sensor 80 is disposed to deviate from 90° by about 2° to 3°. Further, the temperature measuring unit TC of the temperature sensor 80 is preferably provided at the center of the gas introduction pipe 24 (the joint 70) in the radial direction. As a result, the temperature of the gas may be measured with a high accuracy. The temperature measuring unit TC is not limited to being disposed on the central axis Ax of the gas introduction pipe 24 (the joint 70) in FIGS. 2A and 2B, and includes a case where the temperature measuring unit TC is disposed to radially deviate from the central axis Ax. Here, the temperature measuring unit TC does not come into contact with the inner wall of the gas introduction pipe 24 (the joint 70).

With the structure in which the temperature sensor 80 is bonded to the gas introduction pipe 24 at two or more places, the mechanical strength is improved, so that the damage due to the Karman vortex which is caused from, for example, a resonance may be prevented, and the diameter of the sheath thermocouple may be reduced.

The outer diameter of the sheath 81 may be, for example, about 0.08 mm. In this way, by making the temperature sensor 80 thin, the heat capacity of the temperature sensor 80 may be reduced. As a result, the responsiveness may be improved, and the measurement accuracy may be improved.

Examples 1 and 2

Figure 4A:
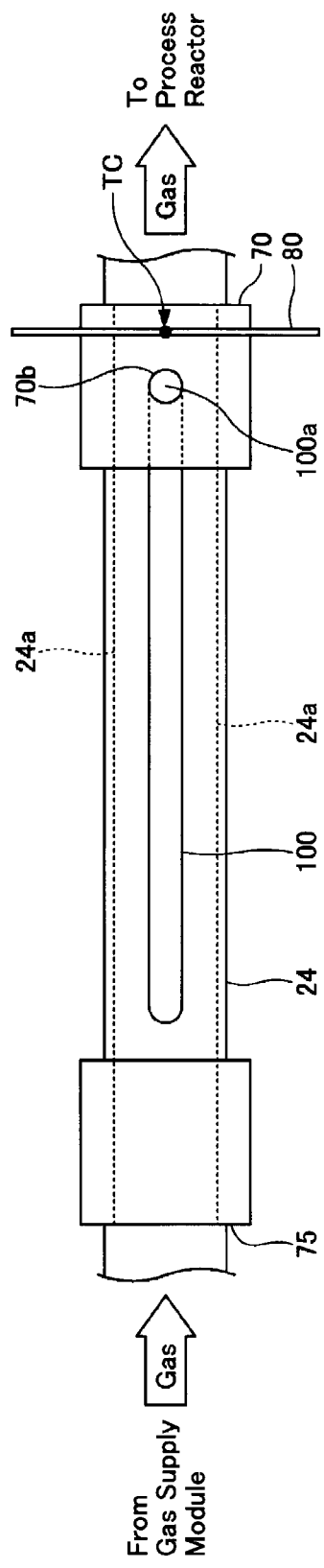
FIGS. 4A and 4B are views illustrating Examples 1 and 2 of a heater according to the embodiment.
Figure 4B:
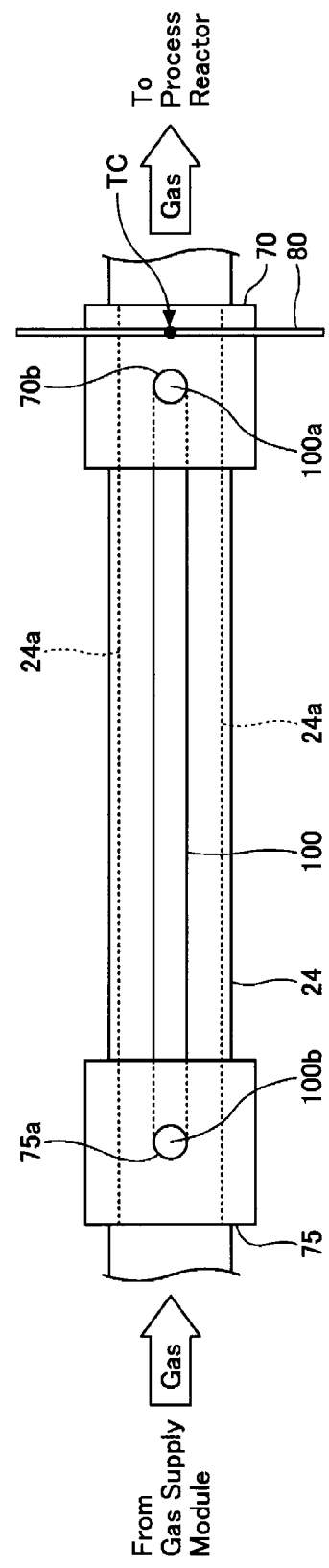

Next, Examples 1 and 2 of the heater 100 according to the embodiment will be described with reference to FIGS. 4A and 4B. FIGS. 4A and 4B are views illustrating Examples 1 and 2 of the heater 100 according to the embodiment.

The heater 100 according to the embodiment is provided in the gas introduction pipe 24 and the joint 70. By providing the heater 100 in the gas introduction pipe 24, the temperature of the gas flowing through the gas introduction pipe 24 may be controlled by using the heater 100. As a result, the variations in process performance due to the temperature of the gas may be suppressed. The heater 100 may not be provided in, for example, the gas introduction pipe 24.

As for the heater 100, a sheath heater in which a heating element is held in a metal sheath, and the gap therein is filled with an insulating material having a good heat conduction may be used. As illustrated in FIGS. 4A and 4B, the heater 100 is configured to be disposed horizontal to the flow of the gas inside the gas introduction pipe 24. The heater 100 may be bonded to the gas introduction pipe 24 at one end or both ends thereof. In the example of FIG. 4A, a through hole 70b is formed in the joint 70 provided with the temperature sensor 80. The heater 100 passes through the through hole 70b, and is bent at a substantially right angle inside the joint 70 to be disposed such that the longitudinal direction of the heater 100 is horizontal to the flow of the gas inside the gas introduction pipe 24. The heater 100 is welded to the joint 70 at the position of the through hole 70b. In this case, one end 100a of the heater 100 is exposed from the through hole 70b. The description that the longitudinal direction of the heater 100 is horizontal to the flow of the gas includes not only a case where the longitudinal direction of the heater 100 is exactly the same as the flow of the gas, but also a case where the longitudinal direction of the heater 100 is substantially the same as the flow of the gas, for example, a case where the longitudinal direction of the heater 100 is oblique to the central axis Ax by about 2° to 3°.

In the example of FIG. 4B, through holes 70b and 75a are formed in the joint 70 provided with the temperature sensor 80 and a joint 75 provided in the gas introduction pipe 24 at a position apart from the joint 70 by the distance corresponding to the length of the heater 100. The heater 100 passes through the through holes 70b and 75a, and is bent at a substantially right angle inside the joint 70 to be disposed horizontal to the flow of the gas inside the gas introduction pipe 24. The heater 100 is welded to the joint 70 at the positions of the through holes 70b and 75a. In this case, both the ends 100a and 100b of the heater 100 are exposed from the through holes 70b and 75a.

In the examples of FIGS. 4A and 4B, the diameter (thickness) of the inner wall 24a of the gas introduction pipe 24 is about 4.4 π, and the heater 100 having a diameter (thickness) of about 2 π is inserted into the inner wall 24a. As a result, the heater 100 that is thick to some extent is disposed horizontal to the flow of the gas, so that the damage to the heater 100 due to the Karman vortex may be prevented.

Further, it is difficult to cause a heat transfer in a laminar flow. Thus, by making the heater 100 thick to some extent, a turbulence is generated inside the gas introduction pipe 24 thereby facilitating the heat transfer, so that the heating efficiency of the heater 100 may be improved.

[Temperature Control Method]

Figure 5:
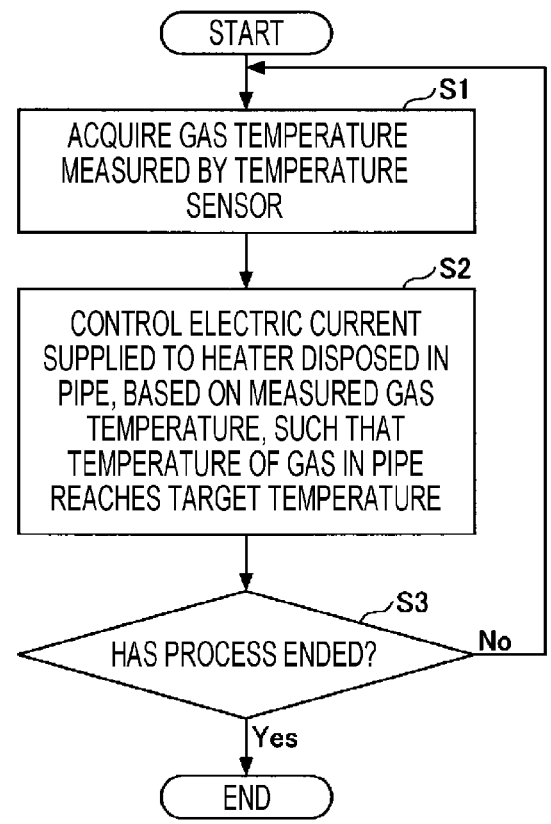
FIG. 5 is a flowchart illustrating a temperature control method according to the embodiment.

Next, a temperature control method according to the embodiment using the semiconductor manufacturing apparatus 1 described above will be described with reference to FIG. 5. FIG. 5 is a flowchart illustrating the temperature control method according to the embodiment. The temperature control method of the present disclosure is executed by the control unit 90.

In this process, first, in step S1, the control unit 90 acquires the gas temperature by the temperature measuring unit TC of the temperature sensor 80 disposed in the gas introduction pipe 24.

Next, in step S2, the control unit 90 controls a current supplied to the heater 100, based on the measured temperature of the gas, such that the temperature of the gas in the gas introduction pipe 24 reaches or approaches a target temperature. The heater 100 is disposed in the gas introduction pipe 24, and is configured to directly heat the gas in the gas introduction pipe 24.

Next, in step S3, the control unit 90 determines whether the process has ended. The control unit 90 repeatedly executes the processes of steps S1 to S3 at predetermined time intervals until it is determined that the process has ended. When it is determined that the process has ended, the control unit 90 ends the process.

As described above, according to the temperature sensor 80 of the present disclosure, the temperature of the gas in the gas introduction pipe 24 may be measured. As a result, the temperature of the gas in the processing container 10 may be predicted more accurately. Further, by making the temperature sensor 80 thin and fixing the temperature sensor 80 at two or more places, the damage to the temperature sensor 80 due to the Karman vortex may be prevented, and by reducing the heat capacity, the dynamic characteristics may be improved. Further, the temperature of the gas may be controlled by disposing the heater 100 inside the gas introduction pipe 24.

In the process such as a filming formation performed by the semiconductor manufacturing apparatus 1, a temperature, a gas concentration, and a pressure are main parameters that affect the substrate processing. Thus, in the present disclosure, in addition to the temperature inside the processing container 10 that has been measured by the temperature sensor 60, the temperature of the gas near the gas inlet of the processing container 10 is measured by using the temperature sensor 80 and the heater 100, and the temperature of the gas is controlled by the heater 100. As a result, the temperature of the gas is actively controlled based on the result of the film forming process, so that the stability of the process may be improved, and the heat load in the processing container 10 may be reduced.

The temperature sensor 80 and the heater 100 may be disposed not only in the gas introduction pipe 24 but also in any other gas pipes such as the external pipe 23 of the gas supply unit 20. The number of each of the temperature sensor 80 and the heater 100 is not limited to one. As a result, it is possible to collect data of the gas temperature inside the gas introduction pipe 24 and other gas pipes, as a temperature which is one of the important parameters that affect the process. Thus, the data of the temperature sensor 80 may be used for various improvements of the semiconductor manufacturing apparatus 1 such as, for example, process conditions, by analyzing the data of the temperature sensor 80 along with the data of other various temperature sensors such as the temperature sensor 60 in the processing container 10.

The semiconductor manufacturing apparatus of the present disclosure may be applied to any type of apparatuses including an atomic layer deposition (ALD) apparatus, a capacitively coupled plasma (CCP) apparatus, an inductively coupled plasma (ICP) apparatus, a radial line slot antenna (RLSA) apparatus, an electron cyclotron resonance plasma (ECR) apparatus, and a helicon wave plasma (HWP) apparatus.

Further, the semiconductor manufacturing apparatus of the present disclosure may be any of a processing apparatus that uses plasma and a processing apparatus that does not use plasma, as long as the apparatus performs a predetermined processing (e.g., a film formation process and an etching process) on the substrates. Further, the semiconductor manufacturing apparatus of the present disclosure may be any of a single-wafer apparatus that processes substrates one by one, a batch apparatus that collectively processes a plurality of substrates, and a semi-batch apparatus that collectively processes a plurality of substrates which is smaller in number than the number of substrates collectively processed by the batch apparatus.

According to an aspect, the temperature of the gas in the gas introduction pipe may be measured.

From the foregoing, it will be appreciated that various embodiments of the present disclosure have been described herein for purposes of illustration, and that various modifications may be made without departing from the scope and spirit of the present disclosure. Accordingly, the various embodiments disclosed herein are not intended to be limiting, with the true scope and spirit being indicated by the following claims.

What is claimed is:

1. A semiconductor manufacturing apparatus comprising:
    a gas introduction pipe connected to a processing container of the semiconductor manufacturing apparatus and configured to introduce a gas into the processing container having a decompressed interior;
    a temperature sensor provided in the gas introduction pipe and configured to measure a temperature of a gas in the gas introduction pipe; and
    a heater disposed in the gas introduction pipe and configured to heat the gas in the gas introduction pipe,
    wherein the temperature sensor is disposed in a joint of the gas introduction pipe connected to an injector of the processing container, and
    the heater is disposed in the joint and extends from the joint into a pipe portion of the gas introduction pipe along a longitudinal direction of the pipe portion.

2. The semiconductor manufacturing apparatus according to claim 1, wherein a temperature measuring point of the temperature sensor is disposed inside an inner wall of the gas introduction pipe.

3. The semiconductor manufacturing apparatus according to claim 1, wherein the temperature sensor is disposed near a gas inlet of the processing container.

4. The semiconductor manufacturing apparatus according to claim 1, wherein the temperature sensor is bonded to the gas introduction pipe at two or more places.

5. The semiconductor manufacturing apparatus according to claim 1, wherein the temperature sensor is configured to penetrate two through holes formed in the gas introduction pipe.

6. The semiconductor manufacturing apparatus according to claim 1, wherein the temperature sensor is configured to penetrate one through hole formed in the gas introduction pipe, and come into contact with the inner wall of the gas introduction pipe at a tip thereof.

7. The semiconductor manufacturing apparatus according to claim 1, wherein the temperature sensor is disposed to be vertical to a flow of the gas flowing in the gas introduction pipe.

8. The semiconductor manufacturing apparatus according to claim 1, wherein the heater is disposed such that a longitudinal direction of the heater is horizontal to the flow of the gas flowing in the gas introduction pipe.

9. The semiconductor manufacturing apparatus according to claim 1, wherein the heater is bonded to the gas introduction pipe at one end or both ends thereof.

10. The semiconductor manufacturing apparatus according to claim 1, wherein the temperature sensor is inserted into a hole defined in the joint and bonded to the joint at the hole.

11. The semiconductor manufacturing apparatus according to claim 1, wherein the heater is bonded to the joint at a through hole defined in the joint and is bent toward the pipe portion to extend into the pipe portion.

12. A temperature control method executed in a semiconductor manufacturing apparatus including:
    a gas introduction pipe connected to a processing container of the semiconductor manufacturing apparatus and configured to introduce a gas into the processing container having a decompressed interior;
    a temperature sensor provided in the gas introduction pipe and configured to measure a temperature of a gas in the gas introduction pipe; and
    a heater disposed in the gas introduction pipe and configured to heat the gas in the gas introduction pipe,
    the temperature control method comprising:
    measuring a temperature of the gas flowing in the gas introduction pipe by using the temperature sensor; and
    controlling an electric current supplied to the heater to make the temperature of the gas in the gas introduction pipe reach or approach a target temperature based on the measured temperature of the gas,
    wherein the temperature sensor is disposed in a joint of the gas introduction pipe connected to an injector of the processing container, and
    the heater is disposed in the joint and extends from the joint into a pipe portion of the gas introduction pipe along a longitudinal direction of the pipe portion.

* * * * *